United States Patent

Schulz et al.

[11] Patent Number: 4,697,967
[45] Date of Patent: Oct. 6, 1987

[54] CONTAINER LOCK

[75] Inventors: Gerd Schulz; Hans-Peter Hartleif, both of Hamburg, Fed. Rep. of Germany

[73] Assignee: Gerd Schulz Fahrzeug- und Container- Technik, Fed. Rep. of Germany

[21] Appl. No.: 741,287

[22] Filed: Jun. 4, 1985

[51] Int. Cl.⁴ .............................................. B63B 25/00
[52] U.S. Cl. ...................................... 410/82; 410/77; 220/23.4
[58] Field of Search ...................... 410/82, 77, 83, 71, 410/76, 80; 403/194, 348; 220/23.4

[56] References Cited

U.S. PATENT DOCUMENTS

| | | | |
|---|---|---|---|
| 2,715 | 7/1842 | Fowler | 403/348 X |
| 2,543,540 | 2/1951 | Anderson | 403/348 X |
| 3,593,387 | 7/1971 | Georgi | 410/82 |
| 3,737,135 | 6/1973 | Bertolini | 410/82 |
| 4,026,596 | 5/1977 | Carr | 410/82 |
| 4,125,077 | 11/1978 | Basso | 410/82 |

FOREIGN PATENT DOCUMENTS 2443554  3/1976  Fed. Rep. of Germany ........ 410/82

*Primary Examiner*—Randolph A. Reese
*Assistant Examiner*—Glenn B. Foster
*Attorney, Agent, or Firm*—Wood, Herron & Evans

[57] ABSTRACT

A twistlock device for locking containers on vehicles. A housing with a cylindrical vertical throughbore includes an upper guide section for engaging an opening in a container corner bracket, and a lower mounting section for connecting the device to a vehicle. The mounting section protrudes beyond the side faces of the guide section and the guide section extends beyond the end faces of the mounting section. An axially unshiftable locking bolt is rotatably carried in the bore. The bolt's top end is provided with a hammerhead, and its bottom end is provided with a handle for twisting the hammerhead between a locking position and a release position. The locking position is secured by a releasable locking element. The twistlock can be shipped to a vehicle manufacturer completely preassembled, and is inserted by the vehicle manufacturer in a hole in a vehicle outrigger where it can be simply and easily mounted by welding.

8 Claims, 4 Drawing Figures

CONTAINER LOCK

This invention concerns container locks.

Container locks of various designs are known. These locks serve to secure containers on vehicles. The containers may be standardized, and are equipped on their corners with so-called container corner brackets. The relative position of the corner brackets on a container, and their design, are also standardized. The most frequently occurring standardized container lengths are customarily of 20, 30, 35 and 40 feet. One type vehicle-mounted lock for such containers features a locking bolt with hammerhead rotatable on a vertical axis, and a brace. The brace protrudes upward from a bearing surface, engages the corner bracket of the container, and serves to absorb the horizontal forces exerted by the container. The hammerhead engages the container's corner bracket as well, and is twistable about its vertical axis to prevent release of the container from the vehicle. Such container locks are also known as twistlocks. So-called clampdown twistlocks, where the hammerhead can be drawn axially down on the bearing surface with the aid of a clamping nut, are typically used today. But for cost reasons, and also because of faster operation, twistlocks without the clamp-down feature, such as shown in U.S. Pat. No. 4,459,072, are also used today.

These container locks or twistlocks are normally shipped to the vehicle manufacturer, and are installed there on a vehicle's frame or outriggers. Many of these prior devices require a specific design to accommodate a specific outrigger and, therefore, may be suited only for one specific vehicle manufacturer. For instance, there are container locks for installation on U-shaped outriggers which subsequently must be reinforced. Others are welded to the top side of outriggers and protrude sideways. Other designs, which are installed on box type outriggers, require extensive slotted recesses in the outrigger. Other prior art twistlocks must be installed in the outrigger by the manufacturer using individual or separate components. This is time-consuming and requires correspondingly expensive stocking. Also, prior art twistlocks are expensive in terms of material.

The problem underlying the invention, therefore, is to market a twistlock or container lock which can be shipped completely assembled, which can be installed easily on a vehicle, and which is simple and inexpensive to manufacture. Additionally, the device should not require any complicated preparatory measures on the vehicle prior to installation. The container lock of this invention solves that problem.

Another problem this invention solves is that with different vehicles the container must be locked through various angles of rotation of the locking bolt and/or hammerhead. On some vehicles there is a 90° rotatability desired, and on others a 70° rotatability is desired. The container lock of this invention enables twisting and securing at various angles of rotation.

In preferred form, the container lock or twistlock of this invention includes a housing through which extends an essentially cylindrical vertical bore. The housing features a first upper guide section whose silhouette and axial height is designed for engaging an opening in a container corner bracket, and which is defined by two vertical side faces and two vertical end faces, the end faces being perpendicular to the side faces and horizontally shorter than the latter. The housing also features a second mounting section arranged underneath the upper guide section and separated from it by a horizontal separating plane, the mounting section radially extending beyond the guide section at the side faces while the guide section extends beyond the mounting section at the end faces. The twistlock includes an axially essentially unshiftable locking bolt in the bore, the upper end of the bolt being provided with a hammerhead and the bottom end of the locking bolt being provided with a handle for twisting the hammerhead between a locking position and a release position. The twist-lock further includes a releasable locking element for securing the bolt in locking position. Two opposite bevels on the housing's mounting section extend radially inward from the center area of the mounting section toward the separating plane at a location below that mounting section's side face. Such a device can be shipped to a vehicle manufacturer completely assembled. All the manufacturer needs to do for installation is to weld it at the opposite bevels to a component of the vehicle. There are no additional installation measures required for the twistlock.

A most preferred embodiment of the invention includes a third bevel, and a fourth bevel opposite the third, on the housing's guide section. These third and fourth bevels extend radially inward from the end faces of that guide section toward the separating plane. This makes it possible to lay a welding bead around the twistlock in order to anchor it in an especially stable and rigid fashion on the vehicle. Further, axially separated areas of the housing bore's wall are preferably provided with axially extending slots. These slots are circumferentially offset relative to one another. A spring-loaded locking element held in a hole of the locking bolt engages the slots to provide for various twist angles for locking.

A preferred embodiment of the invention is described hereafter with the aid of the following figures.

Figure 1:
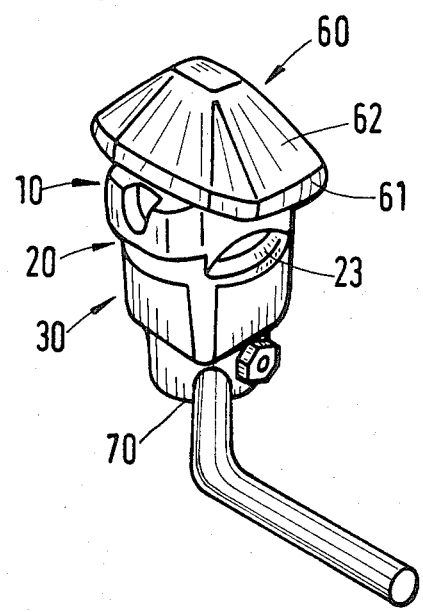
FIG. 1 shows a perspective view of a twistlock in accord with the principles of this invention.
Figure 2:
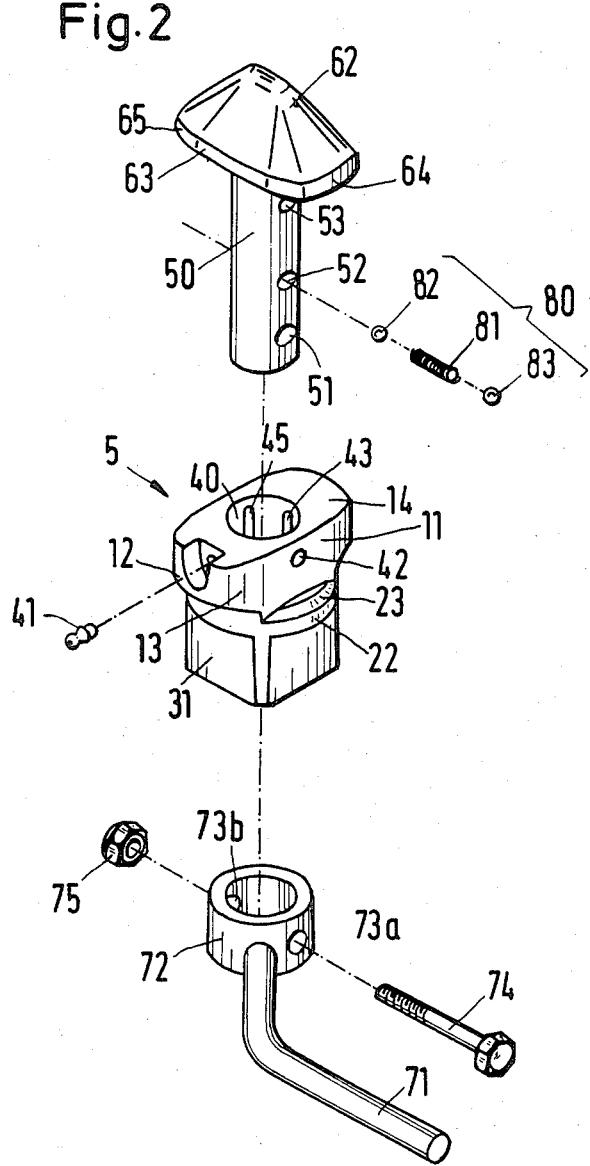
FIG. 2 is an exploded view of the twistlock shown in FIG. 1.
Figure 3:
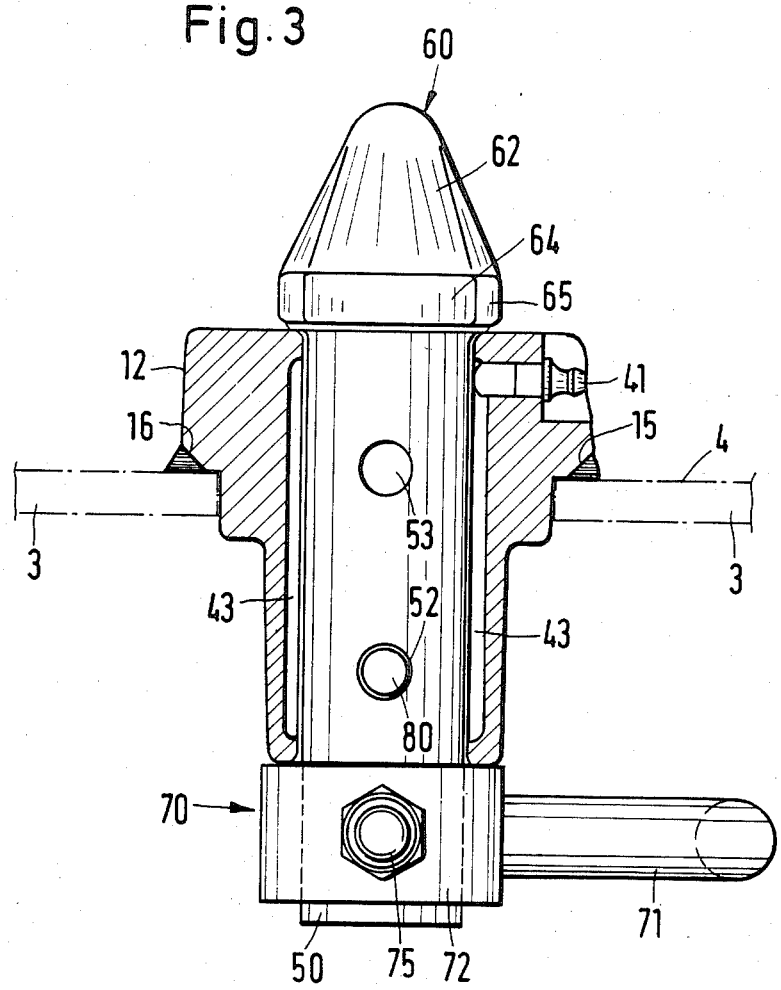
FIG. 3 is a vertical section of the twistlock shown in FIG. 1.
Figure 4:
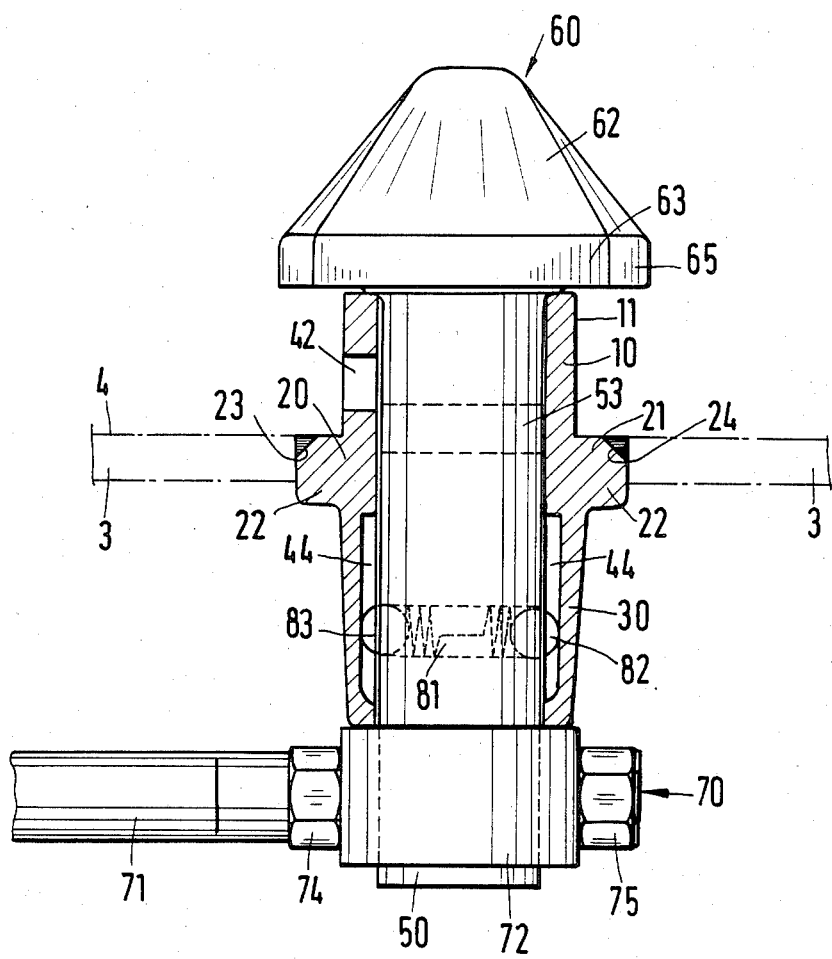
FIG. 4 is a vertical section perpendicular to the section shown in FIG. 3.

A twistlock, as shown in FIGS. 3 and 4, is installed in a vehicle component, specifically an outrigger of a frame in the form of a plate-shaped support 3. The twistlock itself consists of a housing 5 with a first guide section 10, a second mounting section 20, and a third base section 30. Plane 4 separates the guide section 10 from the mounting section 20. A vertical and essentially cylindrical bore 40 extends through the housing, and contains a locking bolt 50 with a hammerhead 60. The locking bolt 50 and the hammerhead 60 can be rotated with the aid of a handle or lever 71. Predetermined positions of the locking bolt 50 are secured by means of a locking element 80.

The upper guide section 10 of the housing 5 has an octagonal horizontal cross section whose dimensions correspond with the standard size of matching openings in a container's corner brackets (not shown). The guide section 10 has two vertical and oppositely arranged side faces 11, and two vertical end faces 12 which are perpendicular to the latter and horizontally shorter than the side faces 11. There are four vertical surfaces 13 between the side faces 11 and the end faces 12, these surfaces being slanted relative to the side faces 11 and the end faces 12. The end faces 12 of the guide section 10 are beveled radially inward from a center area down toward the separating plane 4. The bevels 15 and 16 extend across the entire horizontal dimension of the end faces 12 and also cover the bordering inclined surfaces 13. The section 10 also includes a horizontal top surface 14.

The mounting section 20 of the housing 5 has a circular horizontal cross section. The diameter of the circular cross section is smaller than the longest extension of the guide section 10, and is identical with the size of a prepared circular recess in the support 3. The guide section 10 extends beyond the mounting section 20 at the end faces 12, while the mounting section extends beyond the side faces 11 of the guide section 10. The upper area 21 of the mounting section 20 is beveled radially inward toward the separating plane 4 only in the circular sectors of the section 20 located below the side faces 11 of the guide section 10. Two bevels 23 and 24 below the side faces 11 are thereby formed.

A base section 30 with an essentially quadratic horizontal cross section is located below the mounting section 20. The base section 30 has four rectangular vertical side faces 31. The edges connecting these side faces 31 are rounded and extend into the circular cross section of the mounting section 20. The side faces 31 are parallel with the side faces 11 and/or end faces 12.

A vertical bore 40 extends through the center of the housing 5, a lubrication nipple 41 extending horizontally in the area of the guide section 10 into the bore 40. And a horizontal hole 42 extends radially to the bore 40 from one of the side faces 11 of the section 10. The bore 40 features slots which extend axially of the bore, which extend radially outward of the bore, and which are in axially separate areas of the bore. These include a pair of opposite continuous slots 43, a pair of opposite slots 44 provided only in the bore's lower axial area and circumferentially offset by 90° relative to the slots 43, and a pair of opposite slots 45 provided only in the bore's upper axial area and circumferentially offset by 70° relative to the slots 43. The slots 43, 44, 45 have a semicircular cross section. The diameter of the slots 43, 44, 45 corresponds approximately with the diameter of the hole 42.

A rotatable cylindrical locking bolt 50 extends through the bore 40. The locking bolt 50 is provided with three parallel horizontal through-holes 51, 52, 53. The bottommost hole 51 is provided in the bottom section of the locking bolt that protrudes out of the bore 40. The center hole 52 is located in the bore's lower axial area defined by the slots 44, while the upper hole 53 is located in the bore's upper axial area defined by the slots 45. The diameter of the holes 52, 53 corresponds with the diameter of the hole 42. The hammerhead 60 is positioned at the upper end of the locking bolt 50 and is fixed thereto. The hammerhead 60 has a surrounding vertical rim 61, and a top part 62 above the rim 61 whose cross section decreases upwardly. The cross section of the rim 61 of the hammerhead 60 is the same as the cross section of the guide section 10 of the housing 5. The rim 61 is comprised of two parallel side faces 63, two perpendicular end faces 64, and four connecting inclined surfaces 65.

A lever element 70 in the form of an angular handle 71 connected to an annular collar 72 is attached to the bottom section of the locking bolt 50, and protrudes outwardly beyond the housing 5. The collar 72 is fitted over the locking bolt 50. The collar 72 comprises two bores 73a, 73b which are aligned with the bottom hole 51 of the locking bolt. A screw 74 is inserted in the bores 73a, 73b and the hole 51, the screw being tightened with the aid of a nut 75 to hold the handle 71 and locking bolt in assembly.

The locking element 80 is arranged in one of the holes 52, 53. The locking element 80 consists of a spring 81, and two balls 82, 83 whose diameter equals that of the holes 52, 53. The spring 81 is arranged in compression between the two balls 82, 83. In relaxed position it would be longer than the holes 52, 53.

The twistlock is assembled at a manufacturer by the steps next described. The locking bolt 50 with the hammerhead 60 is first slipped in the housing 5, the hole 42 in the housing being aligned with one of the two holes 52 or 53 depending on which of the click-in positions is desired for the finished twistlock. Next, the locking element 80 is inserted through the hole 42 and into the hole 52 or 53. Then, the locking bolt 50 can be pushed further through the bore 40 in the housing 5 until the hammerhead 60 bears on the top side 14 of the guide section 10 while the bolt's bottom section protrudes out of the bore 40. Now the collar 72 with the handle 71 is slipped on the locking bolt 50 until the bores 73a, 73b are in alignment with the hole 51. The screw 74 is inserted through the bores 73a, 73b and the hole 51, and is held in place with the aid of the nut 75. This completely assembled twistlock can now be shipped to a vehicle manufacturer with no further changes being required to it.

The vehicle manufacturer inserts the complete twistlock assembly through a preformed hole in the support 3 until the mounting section 20 with the circular cross-section sits in the hole of the support 3. The guide section 10 of the housing 5 is now in intimate contact with the support 3, and the separating plane 4 between the guide section 10 and the mounting section 20 coincides exactly with the upper surface of the support 3. The twistlock is now so turned that it will be in the correct position required for future engagement with a container's corner bracket. The housing 5 is now welded to the support 3 at the easily accessible bevels 23 and 24. Next, the bevels 15, 16, which also are easily accessible, can be welded. This establishes a welded bead surrounding the housing 5, and safely prevents the twistlock from being torn up out of the support 3 from below, or from being pushed down out of the support 3 from above.

In use, and for container emplacement, the locking bolt 50 is twisted with the aid of the lever element 70 so that the hammerhead 60 is aligned with the guide section 10 of the housing 5. The container can now be lowered from above so the hammerhead 60 extends through the container bracket's opening. The lowering is facilitated by the upwardly tapered cross section of the hammerhead 60 which enables an exact alignment with the container corner bracket. The opening of the container corner bracket slides over the hammerhead 60 and the guide section 10 of the twistlock housing 5 until it rests on the support 3 of the vehicle. A sideways shifting of the container is no longer possible since the opening cross section of the container corner bracket is identical with the cross section of the guide section 10 of the housing 5. The section 10 thus forms a catch for the container corner bracket. The twistlock is then secured to prevent vertical container movement. The locking bolt 50 is twisted with the aid of the lever element 70 for moving the hammerhead 60 out of alignment with the guide section 10 of the housing 5, and thus with the opening in the container corner bracket. The container corner bracket is thereby secured on the support 3 and can no longer be lifted off.

The locking element 80 is provided to prevent an unintended twisting of the locking bolt 50 and, thus, unintended release of the lock, e.g., during travel. In the predetermined locking position, the two balls 82, 83 run in the slot 44 or 45 depending on the desired locking position. The force of the spring 81 prevents the balls 82, 83 from sliding out of the slots and, thus, prevents the locking bolt 50 from turning in the bore 40. When the lock is to be released for container removal, the force of spring 81 is overcome with the aid of the lever element 70, and the locking bolt 50 is turned in the bore 40 until the locking element 80 clicks into the slots 43. This is the case when the hammerhead 60 is exactly aligned on the first section 10 of the housing 5 and, consequently, the lock is released.

Having described in detail the preferred embodiment of our invention, what we desire to claim and protect by Letters Patent is:

1. A twistlock type container lock, said lock comprising
   a housing having an essentially cylindrical vertical bore therethrough, said housing having an upper guide section whose silhousette and axial height are designed for engaging at opening in a container corner bracket, said guide section being defined by two vertical side faces and two vertical end faces, said end faces being perpendicular to the side faces and having a lesser horizontal width than the end faces, and said housing having a mounting section of circular cross-section positioned underneath said guide section, said mounting section extending substantially beyond said guide section at the side faces while at the end faces said guide section extends beyond said mounting section, said mounting section being adapted to be received in a circular throughbore of a support plate of a vehicle component to interconnect said housing with said support plate, said guide section resting on said support plate, said mounting section being turnable within said throughbore to orient said housing in a desired final position after being received therein but prior to being fixed in that final position to the support plate;
   two opposite bevels defining at least a portion of the upper annular edge of said mounting section, said bevels being positioned on said mounting section below the side faces of said guide section, said bevels extended downwardly from a top surface of said mounting permitting said mounting section to be bonded to said support plate by a weld so that the top surface of said mounting section and said weld are flush with the top surface of said support plate,
   a lock bolt received in said bore, said lock bolt being essentially non-displaceable in its axial direction, but turnable around its axis, said lock bolt having a hammerhead on the upper end thereof, said lock bolt having a handle at the bottom end thereof for twisting said hammerhead between a locking position and a release position, and said lock bolt's hammerhead being supported on its undersurface by the top edge of said housing's upper guide section, and
   a releaseable locking element cooperable with said lock bolt for releasably securing said bolt in its locking position.

2. A lock as set forth in claim 1, said lock comprising opposite third and fourth bevels on said guide section, which bevels extend radially inward from the end faces of said guide section toward said separating plane.

3. A lock as set forth in claim 2, said third and fourth bevels being offset relative to said first two bevels by about 90°.

4. A twistlock type container lock, said lock comprising
   a housing having an essentially cylindrical vertical bore therethrough, said housing having an upper guide section whose silhouette and axial height are fashioned for engaging an opening in a container corner bracket, said guide section being defined by two vertical side faces and two vertical end faces, said end faces being perpendicular to the side faces and having a lesser horizontal width than the end faces, and said housing having a mounting section positioned underneath said guide section, said mounting section extending substantially beyond said guide section at the side faces while said guide section extends beyond said mounting section at the end faces,
   two opposite bevels defining at least a portion of the upper annular edge of said mounting section, said bevels being positioned on said mounting section below the side faces of said guide section, said bevels extended downwardly from a top surface of said mounting permitting said mounting section to be bonded to said support plate by a weld so that the top surface of said mounting section and said weld are flush with the top surface of said support plate,
   wherein the mounting section of the housing is adapted to extend through a hole in said support plate with said guide section resting on said support plate,
   a lock bolt received in said bore, said lock bolt being essentially non-displaceable in its axial direction, but turnable around its axis, said lock bolt having a hammerhead on the upper end thereof, said lock bolt having a handle at the bottom end thereof for twisting said hammerhead between a locking position and a release position, and said lock bolt's hammerhead being supported on its undersurface by the top edge of said housing's upper guide section,
   structure defining a plurality of axially extending slots in at least two circumferentially separate areas of the wall surface of said housing's bore, and
   a spring-loaded radially movable locking element positioned within a transverse hole in said locking bolt, said locking element being received in one of said slots when said bolt is twisted to its locking position for releasably securing said bolt in that locking position, said spring loading continuously biasing said locking element against the wall surface of said housing's bore.

5. A lock as set forth in claim 4, said guide section comprising
   structure defining an assembly hole which during assembly can be aligned with a locking element hole, said assembly hole permitting said locking element to be pushed therethrough into said locking element hole, in said locking bolt during initial assembly of said lock.

6. A lock as set forth in claim 5, said locking element comprising a spring positioned between two identical balls whose diameter is slightly smaller than that said locking element hole and than that of said assembly hole.

7. A lock as set forth in claim 4, said slot structure comprising a first opposite pair of continuous axially extending slots that extend through all axial areas of said bore, and at least one second pair of axially extending slots angular spaced relative to said continuous slots in each of two spaced axial areas of said bore.

8. A lock as set forth in claim 5, said locking bolt comprising a locking element hole located in each of the spaced axial sections of said bore.

* * * * *

UNITED STATES PATENT AND TRADEMARK OFFICE
CERTIFICATE OF CORRECTION

PATENT NO.  : 4,697,967
DATED       : October 6, 1987
INVENTOR(S) : Gerd Schulz

It is certified that error appears in the above-identified patent and that said Letters Patent is hereby corrected as shown below:

In claim 1, column 5, line 31, "end" should be changed to --side--.

In claim 4, column 6, line 20, "end" should be changed to --side--.

Signed and Sealed this

Twenty-ninth Day of October, 1991

Attest:

HARRY F. MANBECK, JR.

*Attesting Officer*   *Commissioner of Patents and Trademarks*